United States Patent [19]
Sellstedt et al.

[11] 3,891,643
[45] June 24, 1975

[54] PYRROLO[1,2,3-DE]QUINOXALIN-2-(3H)-ONES AND RELATED COMPOUNDS

[75] Inventors: John H. Sellstedt, Pottstown; Milton Wolf, West Chester, both of Pa.

[73] Assignee: American Home Products Corporation, New York, N.Y.

[22] Filed: Jan. 25, 1974

[21] Appl. No.: 436,570

Related U.S. Application Data

[62] Division of Ser. No. 252,990, May 15, 1972, Pat. No. 3,813,392, which is a division of Ser. No. 831,723, June 9, 1969, abandoned.

[52] U.S. Cl............................. 260/250 Q; 424/248
[51] Int. Cl........................................... C07d 57/24
[58] Field of Search.................. 260/250 BC, 250 Q

[56] References Cited
FOREIGN PATENTS OR APPLICATIONS
237,153  2/1969  U.S.S.R. ....................... 260/250 BC
256,776  11/1970  U.S.S.R........................... 260/250 Q Primary Examiner—Alton D. Rollins
Attorney, Agent, or Firm—Joseph Martin Weigman

[57] ABSTRACT

This invention concerns pyrrolo [1,2,3-de]quinoxalin-2(3H)-ones and related compounds which are pharmacologically active as central nervous system depressants.

1 Claim, No Drawings

PYRROLO(1,2,3-DE)QUINOXALIN-2-(3H)-ONES AND RELATED COMPOUNDS

This application is a division of application Ser. No. 252,990 filed May 15, 1972, which was issued on May 28, 1974 as U.S. Pat. No. 3,813,392 which was in turn a division of application Ser. No. 831,723 filed June 9, 1969, now abandoned.

This invention relates to new and novel quinoxalines. More particularly it relates to pyrrolo[1,2,3-de]quinoxalin-2(3H)-ones and related compounds which in standard and accepted biological tests have demonstrated usefulness as central nervous system depressants.

The new and useful compounds of the present invention are exemplified by those having the formula:

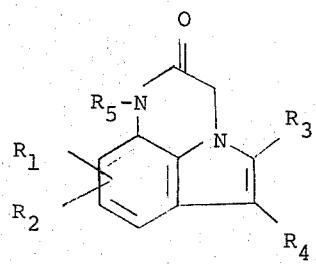

wherein $R_1$ and $R_2$ are selected from the group consisting of hydrogen, nitro, amino, carboxy, cyano, carbamyl, sulfamyl, trifluoromethyl, halogen, lower alkyl, lower alkoxy, lower alkylthio, carb(lower)alkoxy, lower alkylsulfonyl, carboxy (lower)alkyl, lower alkanoylamino, di(lower)alkylamino, phenyl, halophenyl, lower alkylphenyl, lower alkoxyphenyl, phen(lower) alkyl, phen(lower)alkoxy, morpholino, pyridyl, furyl, and naphthyl; $R_3$ and $R_4$ when taken separately are selected from the group consisting of hydrogen, cyano, carboxy, carbamyl, lower alkyl, hydroxy(lower)alkyl, carb(lower)alkoxy, carb(lower)alkoxy (lower)alkoxy, carboxy(lower)alkoxy, di(lower)alkylamino(lower) alkyl, phenyl, hydroxyphenyl, lower alkylphenyl, lower alkoxyphenyl, halophenyl, phen(lower)alkyl, benzoxyphenyl, pyridyl, furyl, and naphthyl; $R_3$ and $R_4$ when concatenated and taken together with the two carbon atoms to which they are attached complete a ring selected from the group consisting of 1-(lower)alkyl-1,2,5,6-tetrahydro-3,4-pyridindiyl, 4,5-dihydro-3H-benzocyclohepten-1,2-ylene, 1-cycloalken-1,2-ylene containing from about 5 to about 12 carbon atoms, 1-(lower)alkyl-1-cyclohexen-1,2-ylene and 3,4-dihydro-1,2-naphthylene; and $R_5$ is selected from the group consisting of hydrogen, lower alkyl, cyano(lower)alkyl, phen(lower)alkyl, morpholino(lower)alkyl, lower alkylamino(lower)alkyl, di(lower)alkylamino(lower)alkyl, N-(lower)alkyl-N'-(lower)alkanoylamino(lower)alkyl aziridinyl (lower)alkyl, azetidinyl(lower)alkyl, azolidinyl(lower)alkyl, azinyl(lower)alkyl, azepinyl(lower)alkyl, 1-(lower)alkyl-piperazinzl(lower)alkyl, 1-phenylpiperazinyl(lower)alkyl, 1-halophenylpiperazinyl(lower)alkyl and 1-phen(lower)alkyl-piperazinyl(lower)alkyl. As employed herein the terms "lower alkyl", "lower alkoxy", "lower alkanoyl" and the like are meant to include both branched and straight chain hydrocarbon groups having from one to about seven carbon atoms. The term "halogen" as used herein is meant to include chlorine, bromine, iodine and fluorine. Typical examples of these compounds are: 7,8,9,10-tetrahydro-8-methyl-1H-pyrido[3',4': 4,5]pyrrolo[1,2,3-de]quinoxalin-2(3H)-one; 8,9-dihydro-1H,7H-benzo[3',4']cyclohepta[1',2':4,5]pyrrolo[1,2,3-de]-quinoxalin-2(3H)-one; 8,9,10-11-tetrahydro-1H,7H-cyclohepta[4,5]pyrrolo [1,2,3-de]quinoxalin-2(3H)-one; 7,8,9,10,11,12-hexahydro-1H-cycloocta[4,5]pyrrolo[1,2,3-de]quinoxalin-2(3H)-one; 8-tert-butyl-7,8,9,10-tetrahydro-1H-pyrazino[3,2,1-jk]carbazol-2(3H)-one; 2,3-dihydro-2-oxo-5-phenyl-1H-pyrrolo[1,2,3-de]quinoxaline-6-acetic acid; 8,9,10,11-tetrahydro-3-methyl-1H,7H-cyclohepta[4,5]pyrrolo[1,2,3-de]-quinoxalin-2(3H)-one; 3-(2-dimethylaminoethyl)-8,9,10,11-tetrahydro-1H,7H-cyclohepta [4,5]pyrrolo[-1,2,3-de]quinoxalin-2(3H)-one; 2,3,8,9,10,11-hexahydro-2-oxo-1H,7H-cyclohepta[4,5]pyrrolo[1,2,3-de]quinoxaline-3-acetonitrile; 8,9,10,11-tetrahydro-3-phenethyl-1H,7H-cyclohepta[4,5]pyrrolo[1,2,3-de]quinoxalin-2(3H)-one; 6-methyl1-(2-dimethylaminoethyl-5-phenyl-1H-pyrrolo[1,2,3-de]quinoxalin-2(3H)-one; and 1-(3-dimethylaminopropyl)-5-methyl-6-phenyl-1H-pyrrolo[1,2,3-de]quinoxalin-2(3H)-one.

The new and novel compounds of the present invention may be prepared by the process which is exemplified by the following reaction scheme:

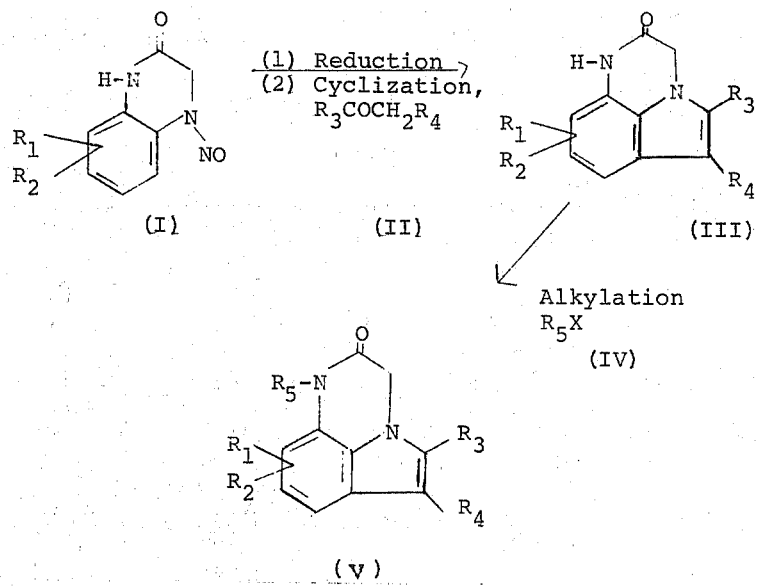

wherein $R_1$, $R_2$, $R_3$, $R_4$ and $R_5$ are defined as above and X is a halogen. The reduction-cyclization reaction is effected by contacting a 1-nitroso-3,4-dihydroquinoxalin-2(1H)-one (I) with zinc dust in acetic acid for about one-half hour at about ambient temperatures. Thereafter, the reduced mixture is contacted with an appropriate ketone (II) at about reflux temperatures for a period of up to about 30 minutes to afford an appropriate 1-unsubstituted product (III). Preferably this reaction is conducted in glacial acetic acid. When the reduction-cyclization reaction is complete, the 1-unsubstituted product (III) is separated by conventional recovery procedures e.g. filter the reaction mixture, wash the cake with acetic acid and a liquid alkanol, and crystallize the 1-unsubstituted product (III) from a suitable solvent, such as, dimethylformamide or dimethylacetamide.

The alkylation reaction is effected by admixing the above-prepared 1-unsubstituted product (III) with hexane washed 50 percent sodium hydride, in an anhydrous, reaction-inert solvent, e.g. dimethylformamide. To this mixture, there is added a solution of an appropriate halide (IV) in an anhydrous, reaction-inert solvent, e.g. dimethylformamide at a temperature range from about 70°C. to about 90°C. for a period of up to about 2 hours. When the alkylation is complete, the resulting 1-substituted product (V) is recovered by standard techniques. For example, the solvent is evaporated to afford a residue which is purified and then crystallized from a suitable solvent, e.g. an alkanol.

The 1-nitroso-3,4-dihydroquinoxalin-2(1H)-ones (I) employed as starting materials in the above-described process are prepared by the procedure of Perkin, W.H. and Riley, G.C. in J. Chem. Soc., 2399 (1923). The ketones (II) and halides (IV) employed in these reactions are commercially available or are easily prepared by processes well known in the chemical art.

The new and novel 1-unsubstituted (III) and 1-substituted (V) products of this invention possess valuable pharmacological activity. In particular, these compounds in standard pharmacological procedures demonstrate nervous system activity and are useful as depressants. Because of this property they are of particular importance in producing a calming effect in animals.

In the pharmacological evaluation of the central nervous system depressant compounds of this invention the in vivo effects of the compound of this invention are tested as follows: The compound is administered orally and intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e. flexor, extensor) and are rated by use of a pole climb and inclined screen for the presence of sedation-ataxia. The Eddy Hot-Plate Method [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity and decreased respiration when administered at a dosage range of 12.7 to 400 mg./kg. There were no deaths in the test animals at the highest dose used, 400 mg./kg. orally and intraperitoneally.

The 1-unsubstituted products (III) of the present invention are also useful intermediates in the preparation of the corresponding 1-substituted products (V) hereof. Further, when tested by the procedure set forth in the Cancer Chemotherapy Raports Number 25, the following 1-substituted products (V) of the present invention have demonstrated activity as anti-tumor agents when administered to rats at an intraperitoneal dosage range from about 62.5 to about 175 mg./kilo of body weight: 1-(3-diemthylaminopropyl)-6-ethyl-5-phenyl-1H-pyrrolo[1,2,3-de]quinoxaline-2(3H)-one; 1-(3-dimethylamino-2-methylpropyl)-6-ethyl-5-phenyl-1H-pyrrolo [1,2,3-de]quinoxalin-2(3H)-one; 1-(2dimethylaminoethyl-6-ethyl-5-phenyl-1H-pyrrolo[1,2,3-de]quinoxalin-2(3H)-one; 1-(2-diethylaminoethyl)-6-ethyl-5-phenyl-1H-pyrrolo[1,2,3-de]-quinoxalin-2(3H)-one; 6-ethyl-5-phenyl-1-[3-(1-pyrrolidinyl)propyl]-1H-pyrrolo[1,2,3-de]quinoxalin-2(3H)-one; 1-(3-dimethylaminopropyl)-5-(p-methoxyphenyl)-6-methyl-1H-pyrrolo[1,2,3-de] quinoxalin-2(3H)-one; 5-(p-benzyloxyphenyl)-1-(3-dimethylaminopropyl)-6-methyl-1H-pyrrolo[1,2,3-de]quinoxalin-2(3H)-one; 1-(3-dimethylaminopropyl)-5-(p-hydroxyphenyl)-6-methyl-1H-pyrrolo[1,2,3-de]quinoxaline-2(3H)-one; 6-methyl-1-(2-dimethylaminoethyl-5-phenyl-1H-pyrrolo[1,2,3-de]quinoxalin-2(3H)-one; 3-(2-diemthylaminoethyl)-7,8,9,10,11,12-hexahydro-1H-cycloocta[4,5]pyrrolo[1,2,3-de]quinoxalin-2(3H)-one; 5-benzyl-1-(2-dimethylaminoethyl)-6-phenyl-1H-pyrrolo[1,2,3-de]quinoxalin-2(3H)-one; and 1-(2-dimethylaminoethyl)-6-ethyl-5-phenyl-1H-pyrrolo[1,2,3-de]quinoxalin-2(3H)-one. Still further, some of the 1-substituted products (V) of the present invention have also demonstrated immunosuppressive activity by their ability to inhibit experimentally induced allergic encephalomyelitis in rats when administered at an intraperitoneal dosage range of about 100 to about 200 mg./kilo of body weight. This immunosuppressive activity was tested by procedures of Brandrise, M.W. Science 140:186, 1963 and Levine et al Proc. Soc. 114:220, 1963. The compounds which have demonstrated this activity are: 1-(3-dimethylaminopropyl)-6-ethyl-5-phenyl-1H-pyrrolo[1,2,3-de]quinoxalin-2(3H)-one; 1-(2-dimethylaminoethyl)-6-ethyl-5-phenyl-1H-pyrrolo[1,2,3-de]quinoxalin-2(3H)-one; and 1-(3-dimethylaminopropyl-5-(p-hydroxyphenyl)-6-methyl-1H-pyrrolo[1,2,3-de]quinoxalin-2(3H)-one.

When the compounds (III and V) of this invention are employed as central nervous system depressants they may be administered to warm-blooded animals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of soltuions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

EXAMPLE I

1-Nitroso-3,4-dihydroquinoxalin-2(3H)-one (20 g., 0.113 mole) is stirred in glacial acetic acid (300 ml.) and zinc dust (40 g.) is added in portions while keeping the temperature below 25°C. When all of the zinc has been added the mixture is stirred an additional 20 minutes. Then the reduction mixture is filtered into a 1 liter flask containing propiophenone (15.2 g., 0.113 mole), and the zinc cake washed with acetic acid (100 ml.) before it dries. The solution is stirred and slowly heated to reflux until crystals form. If crystals form before reflux, the mixture is refluxed for 10 minutes, cooled to 20 °C. in ice, filtered and washed with acetic acid then ethanol, giving light yellow crystals (11.2 g., 36%), m.p. 285°–288°C. (uncorr.) which crystallized from dimethylformamide, give white crystals of 6-methyl-5-phenyl-1H-pyrrolo[1,2,3-de]quinoxalin-2-(3H)-one (10.7 g., 35 %), m.p. 288 -290°C. (uncorr.).

Anal: Calcd for $C_{17}H_{14}N_2O$: C, 77.84; H, 5.38; N, 10.68.
Found: C, 77.92; H, 5.31; N, 10.75.

EXAMPLE II

Repeating the procedure of Example I, to react 1-nitroso-3,4-dihydroquinoxalin-2(1H)-one with an appropriate hereinafter listed ketone, the following products are obtained:

| KETONE | PRODUCT |
| --- | --- |
| N-methyl-4-piperidone | 7,8,9,10-tetrahydro-8-methyl-1H-pyrido[3',4':4,5]pyrrolo[1,2,3-de]quinoxalin-2(3H)-one, m.p. 265–267.5°c., (19% yield) |
| 1-benzosuberone | 8,9-dihydro-1H,7H-benzo[3', 4']cyclohepta[1', 2':4,5]pyrrolo[1,2,3-de]quinoxalin-2(3H)-one, m.p. 295–297°C., (37% yield) |
| cycloheptanone | 8,9,10,11-tetrahydro-1H,7H-cyclohepta[4,5]pyrrolo[1,2,3-de]quinoxalin-2(3H)-one, m.p. 279–282°C., (44% yield). |
| cyclooctanone | 7,8,9,10,11,12-hexahydro-1H-cycloocta[4,5]pyrrolo[1,2,3-de]quinoxalin-2(3H)-one, m.p. 224–227°C., (31% yield). |
| 4-t-butylcyclohexanone | 8-t-butyl-7,8,9,10-tetrahydro-1H-pyrazino[3,2,1-jk]carbazol-2(3H)-one, m.p. 279–282°C., (38% yield). |
| 3-benzoylpropionic acid | 2,3-dihydro-2-oxo-5-phenyl-1H-pyrrolo[1,2,3-de]quinoxalin-6-acetic acid, m.p. 301–303°C., (decomp.), (16% yield). |
| cyclopentanone | 8,9,-dihydro-1H,7H-cyclopenta[4,5]pyrrolo[1,2,3-de]quinoxalin-2(3H)-one, m.p. 283–285°C., (38% yield). |

-Continued

| KETONE | PRODUCT |
| --- | --- |
| a-tetralone | 7,8-dihydro-1H-benzo[a]pyrazino[3,2,1-jk]carbazol-2(3H)-one, m.p. 309–311°C., (23% yield). |
| butyrophenone | 6-ethyl-5-phenyl-1H-pyrrolo[1,2,3-de]quinoxalin-2(3H)-one, m.p. 245–246°C., (54% yield). |
| cyclododecanone | 7,8,9,10,11,12,13,14,15,16-decahydro-1H-cyclododeca[4,5]-pyrrolo[1,2,3-de]quinoxalin-2(3H)-one. m.p. 247–249°C., (56% yield). |
| phenyl-2-propanone | 5-methyl-6-phenyl-1H-pyrrolo[1,2,3-de]quinoxalin-2(3H)-one, m.p. 282–284°C., (51% yield). |
| ethylacetoacetate | 2,3-dihydro-5-methyl-2-oxo-1H-pyrrolo[1,2,3-de]quinoxaline-6-carboxylic acid, ethyl ester, m.p. 266.5–267.5°C., (15% yield) |
| benzoylacetonitrile | 2,3-dihydro-2-oxo-5-phenyl-1H-pyrrolo[1,2,3-de]quinoxaline-6-carbonitrile, m.p. 312–313°C., (36% yield). |
| 4-hydroxy-4'-methoxy-butyrophenone | 6-(2-hydroxyethyl)-5-(p-methoxyphenyl)-1H-pyrrolo[1,2,3-de]-quinoxalin-2(3H)-one, acetate. m.p. 199–201°C., (6% yield). |
| 4-hydroxy-4'-methoxy butyrophenone | 6-(2-hydroxyethyl)-5-(p-methoxyphenyl)-1H-pyrrolo[1,2,3-de]-quinoxalin-2(3H)-one, m.p. 231–233°C., (9% yield). |
| 2-pentanone | 6-ethyl-5-methyl-1H-pyrrolo[1,2,3-de]quinoxalin-2(3H)-one, m.p. 217–219°C., (38% yield). |
| valerophenone | 5-phenyl-6-propyl-1H-pyrrolo[1,2,3-de]quinoxalin-2(3H)-one, m.p. 230–230.5+C., (48% yield). |
| m-chloropropiophenone | 5-(m-chlorophenyl)-6-methyl-1H-pyrrolo[1,2,3-de]quinoxalin-2(3H)-one, m.p. 273–276°C., (60% yield). |
| o-chloropropiophenone | 5-(o-chlorophenyl)-6-methyl-1H-pyrrolo[1,2,3-de]quinoxalin-2(3H)-one, m.p. 219–222°C., (28% yield). |
| levulinic acid | 2,3-dihydro-5-methyl-2-oxo-1H-pyrrolo[1,2,3-de]quinoxaline-6-acetic acid m.p. 286–287°C. (decomp.), (28% yield). |
| p-benzyloxypropiophenone | 5-(p-benzyloxyphenyl)-6-methyl-1H-pyrrolo[1,2,3-de]quinoxalin-2(3H)-one, m.p. 270–273°C., (52% yield). |
| p-methoxypropiophenone | 5-(p-methoxyphenyl)-6-methyl-1H-pyrrolo[1,2,3-de]quinoxalin-2(3H)-one, m.p. 278–281.5°C., (51% yield). |
| p-chloropropiophenone | 5-(p-chlorophenyl)-6-methyl-1H-pyrrolo[1,2,3,-de]quinoxalin-2(3H)-one, m.p. 333–336°C., (57% yield). |

EXAMPLE III

-Nitroso-3,4-dihydroquinoxalin-2(1H)-one (0.565 mole) is stirred in glacial acetic acid (1500 ml.) and zinc dust (200 g.) is added in portions while keeping the temperature below 25°C. When all of the zinc has been added, the mixture is stirred an additional half hour. Then the reaction mixture is filtered into a five liter flask containing 1,3-diphenylpropanone (0.565 mole), and the zinc cake washed with acetic acid (500 ml.). The reaction solution is stirred and slowly heated to reflux until crystals form. If crystals form before reflux, the mixture is refluxed for 10 minutes, cooled in ice, filtered and washed with acetic acid then ethanol, giving crystals of 5-benzyl-6-phenyl-1H-pyrrolo[1,2,3-de]quinoxalin-2-(3H)-one, m.p. 240-242°C. (55% yield).

Anal. Calcd for $C_{23}H_{18}N_2O$: C, 81.63; H, 5.36; N, 8.28.
Found: C, 81.46; H, 5.34; N, 8.27.

EXAMPLE IV

When the procedure of Examples I–III is repeated to react a 1-nitroso-3,4-dihydroquinoxalin-2(1H)-one with an appropriate ketone, there is afforded compounds of the following formula:

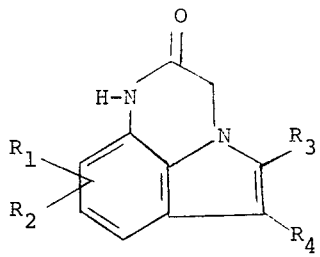

| $R_1$ | $R_2$ | $R_3$ | $R_4$ |
|---|---|---|---|
| hydrogen | 8-cyano | p-tolyl | propyl |
| 8-chloro | 9-chloro | carboxy | p-bromophenyl |
| 8-trifluoromethyl | hydrogen | hydrogen | carbomethoxy |
| 7-ethoxy | 8-amino | carbamyl | p-hydroxyphenyl |
| 9-bromo | 8-carboxy | p-ethylphenyl | hydrogen |
| 8-ethyl | hydrogen | hydrogen | p-methoxyphenyl |
| 8-fluoro | 9-sulfamyl | hydrogen | butyryl |
| 8-nitro | 9-phenyl | p-iodophenyl | hydrogen |
| 8-carbamyl | 9-methylthio | hydrogen | valeryl |
| 7-butyl | hydrogen | hydrogen | carbethoxy |
| 8-ethylthio | 9-iodo | phenpropyl | hydrogen |
| 8-methoxy | 9-methoxy | hydrogen | dimethylaminoethyl |
| p-chlorophenyl | hydrogen | hydrogen | hydrogen |
| 8-morpholino | hydrogen | hydrogen | 2-pyridyl |
| 9-methylsulfonyl | 9-propoxy | hydrogen | 2-naphthyl |
| hydrogen | 9-acetamido | hydrogen | cyano |
| 8-ethylsulfonyl | 9-acetyl | hydrogen | m-fluorophenyl |
| 7-carbomethoxy | 8-benzyl | hydrogen | naphthyl |
| 8-dimethylamino | hydrogen | hydrogen | 2-furyl |
| 8-pyridyl | 9-butylthio | dimethylaminopropyl | hydrogen |
| hydrogen | 9-benzyloxy | hydrogen | hydrogen |
| 8-carbethoxy | 9-p-bromophenyl | p-butoxyphenyl | hydrogen |
| 7-propionyl | hydrogen | hydrogen | phenethyl |
| 8-phenethyl | hydrogen | hydrogen | hydrogen |
| 8-propionamido | hydrogen | hydrogen | carbpropoxy |

EXAMPLE V

1-Nitroso-3,4-dihydroquinoxalin-2(1H)-one (0.226 mole) is stirred in glacial acetic acid (600 ml.) and zinc dust (80g.) is added in portions while keeping the temperature below 25°C. When all of the zinc has been added, the mixture is stirred an additional half hour. Then the reduction mixture is filtered into a 1 liter flask containing N-ethyl-4-piperidene (0.226 mole), and the zinc cake washed with acetic acid (200 ml.). The reaction mixture is stirred and slowly heated to reflux for ten minutes. Thereafter, the mixture is cooled in ice, filtered and washed with acetic acid then methanol, to afford 8-ethyl-7,8,9,10-tetrahydro-1H-pyrido[3',4':4,5]pyrrolo[1,2,3-de]quinoxalin-2(3H)-one.

Similarly, when the following ketones are reacted with and appropriate 1-nitroso-3,4-dihydroquinoxalin-2(1H)-one, the following products are afforded:

| KETONE | PRODUCT |
|---|---|
| N-propyl-4-piperidene | 7,8,9,10-tetrahydro-8-propyl 1H-pyrido[3',4':4,5]pyrrolo [1,2,3-de]quinoxalin-2(3H)-one |
| 1-methylpiperidone | 7,8,9,10-tetrahydro-5,8-dimethyl-1H-pyrido[3',4':4,5]pyrrolo [1,2,3-de]quinoxalin-2(3H)-one |
| 4-propylpiperidone | 7,8,9,10-tetrahydro-8-propyl-1H-pyrido[3',4':4,5]pyrrolo [1,2,3-de]quinoxalin-2(3H)-one |

EXAMPLE VI

When the procedures of the prior Examples are repeated to react a 1-nitroso-3,4-dihydroquinoxalin-2(1H)-one with an appropriate ketone, the following compounds are prepared: 6-(3-hydroxypropyl)-8-phenbutyl-1H-pyrrolo[1,2,3-de]quinoxalin-2(3H)-one propionate;

8-benzyl-1H-pyrrolo[1,2,3-de]quinoxaline-2(3H-one;

8-(2-furyl)-1H-pyrrolo[1,2,3-de]quinoxalin-2(3H)-one;

9-diethylamino-1H-pyrrolo[1,2,3-de]quinoxalin2(3H)-one;

8-(2-naphthyl)-1H-pyrrolo[1,2,3-de]quinoxalin2(3H)-one;

7(m-butylphenyl)-1H-pyrrolo[1,2,3-de]quinoxalin2(3H)-one;

8-(p-methoxyphenyl)-1H-pyrrolo[1,2,3-de]quinoxalin2(3H)-one;

8-(p-propoxyphenyl)-1H-pyrrolo[1,2,3-de]quinoxalin2(3H)-one;

8-phenethoxy-1H-pyrrolo[1,2,3-de]quinoxalin-2(3H)-one;

9-dipropylamino-1H-pyrrolo[1,2,3-de]quinoxalin2(3H)-one;

8-(p-fluorophenyl)-1H-pyrrolo[1,2,3-de]quinoxalin2(3H)-one;

8(o-iodophenyl)-1H-pyrrolo[1,2,3-de]quinoxalin2(3H)-one; and 8-(N-methyl-N'-propylamino)-1H-pyrrolo[1,2,3-de]quinoxalin-2(3H)-one.

EXAMPLE VII

6-Ethyl-5-phenyl-1H-pyrrolo[1,2,3-de]quinoxaline-2(3H)-one (8.3 g., 0.03 mole) is added to a mixture of hexane washed 50% sodium hydride (1.52 g., 0.0316 mole) in anhydrous dimethylformamide (50 ml.), and the mixture is stirred at room temperature until all the solids dissolve. A solution of 3-dimethylaminopropyl chloride (4.02 g., 0.033 mole) in anhydrous dimethylformamide (5 ml.) is added all at once, and stirred at 70°–90°C. for one and a half hours. All of the solvent is removed under vacuum and the residue is dissolved in a mixture of methylene chloride-water. The water is extracted once more with methylene chloride, and the methylene chloride washed with water, saturated salt, and dried with sodium sulfate. Concentration under vacuum, gives a tan solid (10 g.), m.p. 108°C. (uncorr.). The solid is crystallized from absolute ethanol, giving white crystals of 6-ethyl-1-(3-dimethylaminopropyl)-5-phenyl-1H-pyrrolo[1,2,3-de]quinoxalin-2(3H)-one (9.5 g., 88% yield), m.p. 114°–116°C. (uncorr.).

Anal. Calcd for $C_{23}H_{27}N_3O$: C, 76.42; H, 7.53; N, 11.63.
Found: C, 76.36; H, 7.51; N, 11.70.

EXAMPLE VIII

When the procedure of Example I is repeated to react pyrrolo[1,2,3-de]quinoxalin-2(3H)-ones with appropriate halide derivatives, the following compounds are afforded:

3-(3-dimethylamino)-8,9,10,11-tetrahydro-1H,7H-cyclohepta[4,5]pyrrolo[1,2,3-de]quinoxalin-2(3H)-one, m.p. 104°–106°C., 56% yield;

8,9,10,11-tetrahydro-3-methyl-1H,7H-cyclohepta[4,5]pyrrolo[1,2,3-de]quinoxalin-2(3H)-one, m.p. 113°–115°C., 100% yield;

3-(2-dimethylaminoethyl)-8,9,10,11-tetrahydro-1H,7H-cyclohepta[4,5]pyrrolo[1,2,3de]quinoxalin-2(3H)-on, m.p. 101.5°–103°C., 49% yield;

2,3,8,9,10,11-hexahydro-2-oxo-1H,7H-cyclohepta[4,5]pyrrolo[1,2,3-de]quinoxaline-3-acetonitrile, m.p. 239°–241°C., 67% yield;

8,9,10,11-tetrahydro-3-phenethyl-1H,7-H-cyclohepta [4,5]pyrrolo[1,2,3-de]quinoxalin-2(3H)-one, m.p. 163.5°–165°C., 41% yield;

6-methyl-1-(2-dimethylaminoethyl)-5-phenyl-1H-pyrrolo[1,2,3-de]quinoxalin-2(3H)-one, m.p. 150°–152°C., 68% yield;

1-(3-dimethylaminopropyl)-5-methyl-6-phenyl-1H-pyrrolo[1,2,3-de]quinoxalin-2(3H)-one, m.p. 140°–142.5°C., 84% yield;

3-(2-dimethylaminoethyl)-7,8,9,10,11,12-hexahydro-1H-cycloocta[4,5]pyrrolo[1,2,3-de]-quinoxalin-2(3H)-one, m.p. 112°–114°C., 64% yield;

3-(3-dimethylaminopropyl)-8,9-dihydro-1H,7H-cyclopenta[4,5]pyrrolo[1,2,3-de]quinoxalin-2(3H)-one, m.p. 102°–103°C., 68% yield;

5benzyl-1-(2-dimethylaminoethyl)-6-phenyl-1H-pyrrolo[1,2,3-de]quinoxalin-2(3H)-one, m.p. 152°–153°C., 60% yield;

1-(3-dimethylamino-2-methylpropyl)-6-ethyl-5-phenyl-1H-pyrrolo[1,2,3-de]quinoxalin-2(3H)-one, m.p. 121-123°C., 40% yield;

1-(3-dimethylamino-1-methylpropyl)-6-ethyl-5-phenyl-1H-pyrrolo[1,2,3-de]quinoxalin-2(3H)-one, m.p. 96.5°–98°C., 17% yield;

1-(2-dimethylaminoethyl)-6-ethyl-5-phenyl-1H-pyrrolo[1,2,3-de]quinoxalin-2(3H)-one, m.p. 154°–155.5°C., 76% yield;

1-(3-dimethylaminopropyl)-6-methyl-5-phenyl-1H-pyrrolo[1,2,3-de]quinoxalin-2(3H)-one, m.p. 127.5°–129.5°C., 80% yield;

1-(3-dimethylaminopropyl)-5-phenyl-6-propyl-1H-pyrrolo[1,2,3-de]quinoxalin-2(3H)-one, m.p. 119°–121,5°C., 61% yield;

1-(3-dimethylaminopropyl)-6-ethyl-5-methyl-1H-pyrrolo[1,2,3-de]quinoxalin-2(3H)-one, m.p. 88°–90.5°C., 67% yield;

6-ethyl-1-(2-morpholinoethyl)-5-phenyl-1H-pyrrolo[1,2,3-de]quinoxalin-2(3H)-one, m.p. 163.5°–165.5°C. 83% yield;

1-(2-diethylaminoethyl)-6-ethyl-5-phenyl-1H-pyrrolo[1,2,3-de]quinoxalin-2(3H)-one, m.p. 91°–92.5°C., 62% yield;

6-ethyl-1-(3-morpholinopropyl)-5-phenyl-1H-pyrrolo[1,2,3-de]quinoxalin-2(3H)-one, m.p. 110°–112°C., 67% yield;

N-[3-(6-ethyl-2,3-dihydro-2-oxo-5-phenyl-1H-pyrrolo[1,2,3-de]quinoxalin-1-yl)propyl]-N-methylformamide, m.p. 124.5°–126.5°C., 63% yield;

6-ethyl-5-phenyl-1-[2-(1-pyrrolidinyl)-ethyl]-1H-pyrrolo[1,2,3-de]quinoxalin-2(3H)-one, m.p. 160°–161.5°C., 84% yield;

6-ethyl-1-(3-methylaminopropyl)-5-phenyl-1H-pyrrolo[1,2,3-de]quinoxalin-2(3H)-one, m.p. 212°–214°C., 30% yield;

6-ethyl-5-phenyl-1-[3-(1-pyrrolidinyl)propyl]-1H-pyrrolo[1,2,3-de]quinoxalin-2(3H)-one, m.p. 135°–136°C., 77% yield;

1-(3-dimethylaminopropyl)-5-(p-methoxyphenyl)-6-methyl-1H-pyrrolo[1,2,3-de]quinoxalin-2(3H)-one, m.p. 169.5°–171°C., 85% yield;

5-(p-benzyloxyphenyl)-1-(3-dimethylaminopropyl)-6-methyl-1H-pyrrolo[1,2,3-de]quinoxalin-2(3H)-one, m.p. 138°–140°C., 79% yield;

5-(m-chlorophenyl)-1-(3-dimethylaminopropyl)-6-methyl-1H-pyrrolo[1,2,3-de]quinoxalin-2(3H)-one, m.p. 107°–109°C., 77% yield;

5-(p-chlorophenyl)-1-(3-dimethylaminopropyl)-6-methyl-1H-pyrrolo[1,2,3-de]quinoxalin-2(3H)-one, m.p. 186°–188°C., 71% yield;

1-(3-dimethylaminopropyl)-5-(p-hydroxyphenyl)-6-methyl-1H-pyrrolo[1,2,3-de]quinoxalin-2(3H)-one, m.p. 172.5°–175.5°C., 88% yield;

1-(3-dimethylaminopropyl)-5-phenyl-1H-pyrrolo[1,2,3-de]quinoxalin-2(3H)-one, m.p. 131°–132°C., 14% yield; and 5-(o-chlorophenyl)-1-(3-dimethylaminopropyl)-6-methyl-1H-pyrrolo[1,2,3-de]quinoxalin-2(3H)-one, m.p. 190.5°–192.5°C., 61% yield.

EXAMPLE IX 7,8,9,10-Tetrahydro-8-methyl-1H-pyrido[3',4':4,5]pyrrolo[1,2,3-de]quinoxalin-2(3H)-one (0.06 mole) is added to a mixture of hexane washed 50% sodium hydride (0.0632 mole) in anhydrous dimethylformamide (50 ml.), and the mixture is stirred at room temperature until all the solids dissolve. A solution of 3-dimethylaminopropyl chloride (0.066 mole) in anhydrous dimethylformamide (10 ml.) is added all at once, and stirred at 70°–90°C. for 2 hours. All of the solvent is removed under vacuum and the residue is dissolved in a mixture of methylene chloride-water. The water is extracted once more with methylene chloride, the methylene chloride washed with water, saturated salt, and dried with sodium sulfate. Concentration under vacuum, affords a solid which is crystallized from absolute methanol to afford 7,8,9,10-tetrahydro-8-methyl-1-(3-dimethylaminopropyl)-1-H-pyrido[3',4':4,5]pyrrolo[1,2,3-de]quinoxalin-2(3H)-one.

In a similar manner, the following compounds are prepared:

8-t-butyl-7,8,9,10-tetrahydro-1-[2-(1-pyrrolidinyl)ethyl]-1H-pyrazino[3,2,1-jk]carbazol-2(3H)-one;

1-ethyl-2,3-dihydro-2-oxo-5-phenyl-1H-pyrrolo[1,2,3-de]quinoxalin-6-acetic acid;

1-[3-(1-aziridinyl)-propyl]8,9-dihydro-1H,7H-cyclopenta[4,5]pyrrolo[1,2,3-de]quinoxalin-2(3H)-one;

1-benzyl-7,8-dihydro-1H-benzo[a]pyrazino[3,2,1-jk]carbazol-2(3H)-one;

7,8,9,10,11,12,13,14,15,16-decahydro-1-(2-dimethylaminoethyl)-1H- cyclododeca[4,5]pyrrolo[1,2,3-de]quinoxalin2(3H)-one;
2,3-dihyro-1,5-dimethyl-2-oxo-1H-pyrrolo[1,2,3-de]quinoxaline-6-carboxylic acid, ethyl ester;
6-(2-hydroxyethyl)-5-(p-methoxyphenyl)-1-phenpentyl-1H-pyrrolo[1,2,3-de]quinoxalin-2(3H)-one, acetate;
1-butyl-5-(p-methoxyphenyl)-6-methyl-1H-pyrrolo[1,2,3-de]quinoxalin-2(3H)-one;
13-chloro-7,8,9,10-tetrahydro-1-(3-(1-methylpiperazinyl)propyl]-8-propyl-1H-pyrido[3',4':4,5[pyrrolo[1,2,3-de]quinoxalin-2(3H)-one;
1-(2-[1-(p-chlorophenyl)piperazinyl]ethyl-7,8,9,10-tetrahydro-8,14-dimethyl-1H-pyrido[3',4':4,5]pyrrolo[1,2,3-de]quinoxalin-2(3H)-one;
1-(3-[1-(m-bromophenyl)piperazinyl]propyl)-6-(3-hydroxypropyl)-8-phenbutyl-1H-pyrrolo[1,2,3-de]quinoxalin-2(3H)-one, propionate;
8-benzyl-1-[4-(1-benzylpiperazinyl)butyl]-1-H-pyrrolo[1,2,3-de]quinoxalin-2(3H)-one;
8-(2-furyl)-1-[3-(1-phenethylpiperazinyl)propyl]-1H-pyrrolo[1,2,3-de]quinoxalin-2(3H)-one;
9-diethylamino-1-methyl-1H-pyrrolo[1,2,3-de]quinoxalin-2(3H)-one;
1-(2-[1-(p-iodophenyl)piperazinyl]ethyl)-8-(2-naphthyl)-1H-pyrrolo[1,2,3-de]quinoxalin-2(3H)-one;
1-(4-[1-(p-fluorophenyl)piperazinyl]butyl)-8-(p-methoxyphenyl)-1H-pyrrolo[1,2,3-de]quinoxalin-2(3H)-one;
1-ethyl-8-(p-propoxyphenyl)-1H-pyrrolo[1,2,3-de]quinoxalin-2(3H)-one;
1-(2-cyanoethyl)- ... 1H-pyrrolo[1,2,3-de]quinoxalin-2(3H)-one;
1-methyl-9-dipropylamino-1H-pyrrolo[1,2,3-de]quinoxalin-2(3H)-one,
1-benzyl-8-(p-fluorophenyl)-1H-pyrrolo[1,2,3-de]quinoxalin-2(3H)-one; and
1-ethyl-8-(N-methyl-N'-propylamino)-1H-pyrrolo[1,2,3-de]quinoxalin-2(3H)-one.

EXAMPLE X

When the procedure of Example I-III is repeated to react pyrrolo[1,2,3-de]quinoxalin-2(3H)-ones with appropriate halide derivatives, compounds having the following formula are obtained:

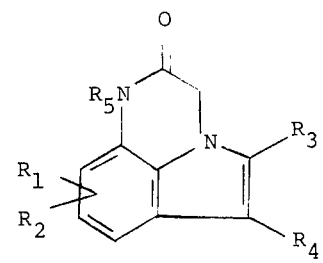

wherein $R_1$, $R_2$, $R_3$, $R_4$ and $R_5$ are defined as follows:

| $R_1$ | $R_2$ | $R_3$ | $R_4$ | $R_5$ |
|---|---|---|---|---|
| hydrogen | 8-cyano | p-tolyl | propyl | propyl |
| 8-chloro | 9-chloro | carboxy | p-bromophenyl | 4-'morpholinobutyl |
| 8-trifluoromethyl | hydrogen | hydrogen | carbomethoxy | 2-cyanoethyl |
| 7-ethoxy | 8-amino | carbamyl | p-hydroxyphenyl | 3-diethylaminopropyl |
| 9-bromo | 8-carboxy | p-ethylphenyl | hydrogen | 3-N-acetyl-N'-ethyl-amino)propyl |
| 8-ethyl | hydrogen | hydrogen | p-methoxyphenyl | 4-(N-methyl-N'-propionyl-amino)butyl |
| 8-fluoro | 9-sulfamyl | hydrogen | butyryl | 4-(1-aziridinyl)butyl |
| 8-nitro | 9-phenyl | p-iodophenyl | hydrogen | 4-cyanobutyl |
| 8-carbamyl | 9-methylthio | hydrogen | valeryl | 3-(1-pyrrolidinyl)propyl |
| 7-butyl | hydrogen | hydrogen | carbethoxy | 2-(1-azetidinyl)ethyl |
| 8-ethylthio | 9-iodo | phenpropyl | hydrogen | 5-(1-azepinyl)pentyl |
| 8-methoxy | 9-methoxy | hydrogen | dimethylaminoethyl | 4-dibutylaminobutyl |
| 8-p-chlorophenyl | hydrogen | hydrogen | hydrogen | 2-dimethylaminoethyl |
| 8-morpholino | hydrogen | hydrogen | 2-pyridyl | 3-(1-azetidinyl)propyl |
| 8-methylsulfonyl | 9-propoxy | hydrogen | 2-naphthyl | 3-(1-pyrrolidinyl)propyl |
| hydrogen | 9-acetamido | hydrogen | cyano | 2-(1-azepinyl)ethyl |
| 8-ethylsulfonyl | 9-acetyl | hydrogen | m-fluorophenyl | 4-propylaminobutyl |
| 7-carboxymethoxy | 8-benzyl | hydrogen | naphthyl | 4-(1-pyrrolidinyl)butyl |
| 8-dimethylamino | hydrogen | hydrogen | 2-furyl | 2-methylaminoethyl |
| 8-pyridyl | 9-butylthio | diethylaminopropyl | hydrogen | 2-(1-methylpiperazinyl)ethyl |
| hydrogen | 9-benzyloxy | hydrogen | hydrogen | 3-(1-phenylpiperazinyl)propyl |
| 8-carbethoxy | 9-p-bromophenyl | p-butoxyphenyl | hydrogen | 3-ethylaminopropyl |
| 7-propionyl | hydrogen | hydrogen | phenethyl | benzyl |
| 8-phenethyl | hydrogen | hydrogen | hydrogen | 2-(1-aziridinyl)ethyl |
| 8-propionamido | hydrogen | hydrogen | carbpropoxy | 4-(1-azepinyl)butyl |

What is claimed is:
1. 7,8,9,10-tetrahydro-8-methyl-1H-pyrido[3',4':4,5]pyrrolo[1,2,3-de]quinoxalin-2(3H)-one.

* * * * *